Nov. 4, 1924.
H. D. CHURCH
MOTOR VEHICLE
Filed March 29, 1919    2 Sheets-Sheet 1
1,513,966
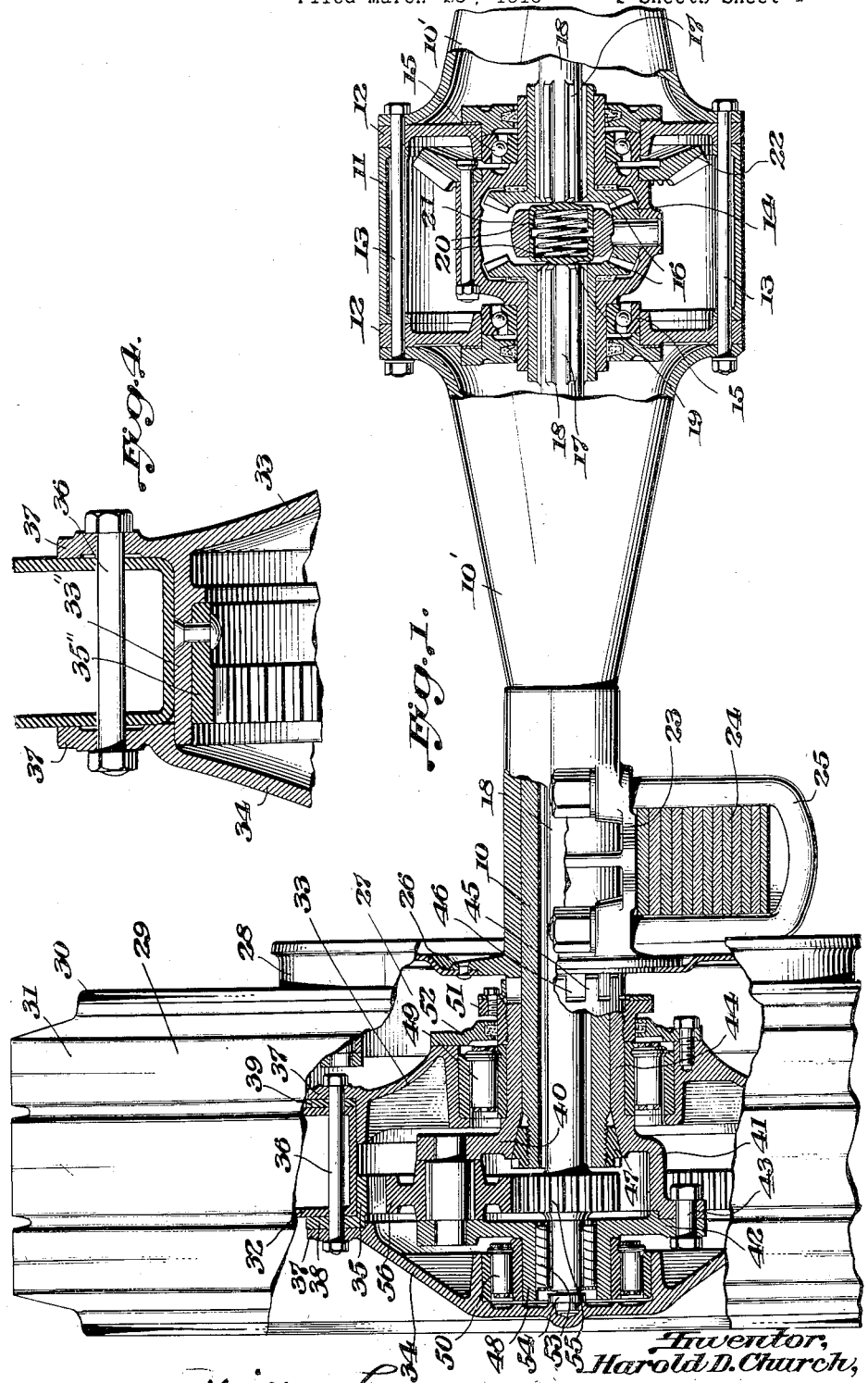

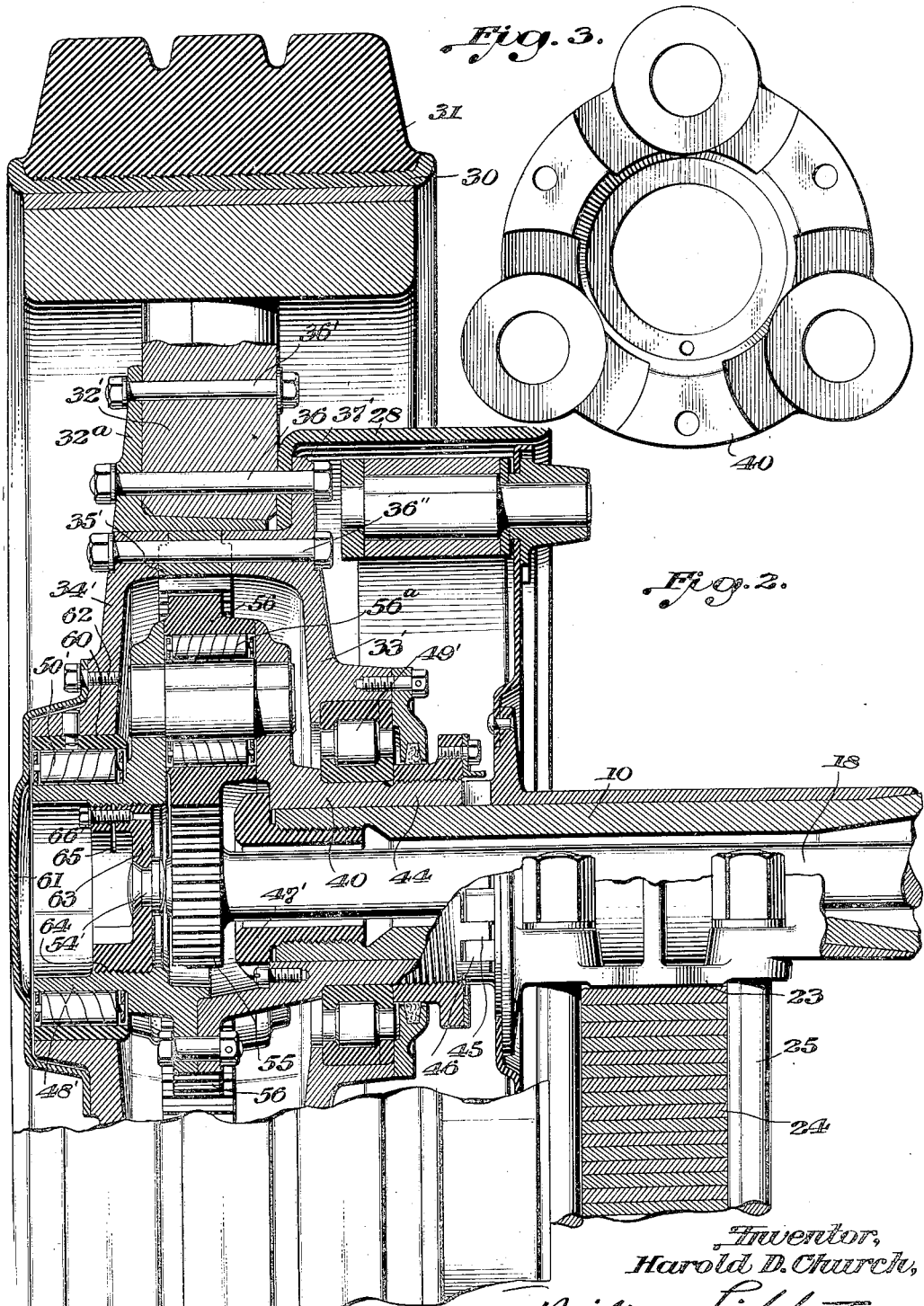

Patented Nov. 4, 1924.

1,513,966

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 29, 1919. Serial No. 286,090.

*To all whom it may concern:*

Be it known that I, HAROLD D. CHURCH, a citizen of the United States, and resident of Detroit, Wayne County, State of Michigan, have invented certain new and useful Improvements in Motor Vehicles, of which the following is a specification.

This invention relates to motor vehicles and particularly to wheel and axle construction.

One of the objects of the invention is to provide a strong and durable wheel and axle construction of novel form.

Another object of the invention is to provide a heavy truck or traction wheel in which the hub is made in two parts and adapted to house the reduction gearing therein. Various forms of such wheels are shown and described.

Another object of the invention is to provide, in an axle having reduction gearing in the wheel hub, a direct connection from the torque reaction member to the spring pad mounted on the axle, such construction being particularly useful in connection with what is known as the "Hotchkiss drive" between the axle and vehicle frame.

Another object of the invention is to provide a supporting member on the end of the axle member with bearings for the road wheel at the side of the gears mounted on said supporting member, thus providing rather wide separation for the road wheel bearings and placing the gearing well within the hub of the wheel.

Other objects of the invention will appear from the following description taken in connection with the drawings which form part of this specification and in which, Fig. 1 is a vertical longitudinal section, with parts in elevation, of a wheel and axle construction embodying the invention;

Fig. 2 is an enlarged view similar to Fig. 1, showing only the outer end of the axle and the wheel mounted thereon, and embodying a slightly different form of the invention;

Fig. 3 is a detail view; and

Fig. 4 is a fragmentary sectional view showing another form of wheel construction.

Referring to the drawings, 10 is an axle member which is of tubular form. At its inner end it is somewhat expanded or conical in shape and it is secured together with a similar axle member 10', to a middle axle member 11 and intermediate plates 12, as by the bolts 13, as shown in Fig. 1. A differential mechanism 14 of usual type is mounted on bearings 15 in the plates 12 at the middle of the axle. Gears 16 of said differential mechanism are splined as shown and adapted to support the inner splined ends 17 of axle sections or driving shafts 18. These axle sections are slightly separated and a coiled spring 19 is arranged between them. Wear pieces 20 are arranged at the ends of the spring 19 and are provided with spherical outer surfaces in direct contact with the flat ends of the shafts 18 to give substantially point contact. The wear pieces 20 and the spring 19 are shown as mounted in the spider 21 of the differential mechanism.

A driven bevel gear 22 is mounted upon the housing of the differential mechanism and it will be understood that the gear and consequently the housing are rotated by a driving pinion from the motor of the vehicle.

A spring pad 23 is mounted near the outer end of each of the axle members 10. One end only of the axle is shown in Fig. 1 but it will be understood that the other end of the axle is similar in construction. The spring pad 23 supports a spring 24 as by spring clips 25, and a bracket 26 on the spring pad supports a brake shoe 27 which co-operates with a brake drum 28 on a road wheel 29.

The road wheel 29 comprises as its essential parts a rim member 30 upon which is mounted a tire 31, a spoke member 32 which may be in a single piece as shown in Fig. 1 if the wheel is an all-steel wheel, and a two-part hub member comprising the inner part 33 and the outer part 34. The hub member forms a housing for the gearing hereinafter described and an internal gear member 35 is secured to the wheel and arranged within this housing. The parts of the hub member, the gear member 35, and the brake drum 28 are secured to the spoke member 32 of the wheel by bolts 36, a sufficient number of these bolts being provided to insure a strong and rigid construction. The bolts 36 pass through the peripheral flanges 37 of the hub parts 33 and 34 and the flanges 38 and 39 on the gear member 35 and brake drum 28 respectively.

At the extreme outer end of the axle member 10 is mounted a member 40 which is shown as formed in two pieces 41 and 42 bolted together as by bolts 43. This member 40 has a sleeve part 44 which slides upon the outer end of the axle member and is provided with teeth or jaws 45 which are adapted to engage in clutching relation with similar teeth or jaws 46 formed integrally or otherwise on the spring pad 23. A jam nut 47 threaded on the outer end of the axle member 10 holds the member 40 in place on the axle member. It will be understood that by removing the nut 47 the member 40 may be withdrawn and its teeth disengaged from the spring pad.

The outer part 42 of the member 40 is also provided with a sleeve portion 48 and the hub members 33 and 34 of the road wheel are provided with separated bearings 49 and 50, the bearing 49 having its inner race on the sleeve 44 and the bearing 50 having its inner race on the sleeve 48. A threaded ring 51 retains the bearing 49 on the sleeve 44 and a packing ring 52 which operates on the periphery of the ring 51 and is secured to the hub part 33, prevents entrance of foreign matter to the housing formed by the hub members.

The axle section or driving shaft 18, above referred to, extends through the tubular axle member 10 and beyond the end thereof. Its extreme outer end enters the sleeve 48 and is supported therein in a roller bearing 53 which is of the type that permits longitudinal movement of the parts relative to it. A hardened steel button 54 is mounted in the hub part 34 in alignment with the axle section 18 and forms an abutment for the axle section outwardly. The end of the axle section is slightly spherical to form a substantially point contact with the button 54.

It will be understood that the spring 19 hereinabove described will yieldingly press the axle section 18 outwardly against the button 54 and thereby prevent end play and retain the axle section in correct position.

The axle section 18 has a spur pinion 55 at its outer end just inside of the bearing 53 and within the two-part member 40 above referred to. This pinion 55 is in a plane with the internal gear 35 above described and between the pinion and internal gear is an intermediate gear 56 which meshes with both of them. Preferably two or more of these intermediate gears are used; there are three in the construction shown in Fig. 1. These gears 56 are suitably supported by the member 40 and the hub parts 33, 34 are arranged at the sides of the gears, the bearing 49 being on the member 40 at one side of the gears and the bearing 50 being on the member 40 on the other side of the gears.

By this form of gearing the road wheel is driven by the axle section 18 through the pinion 55, gears 56, and internal gear 35, and the member 40 becomes a torque reaction member in addition to its function of supporting the gears 56 and the bearings 49, 50 of the road wheel. Moreover, by reason of the clutching connection of the member 40 with the spring pad 23 the torque reaction of the reduction gearing in the hub is transferred directly to the spring pad. This is particularly desirable in the use of this form of axle with the "Hotchkiss drive" or that form of vehicle in which the drive and the torque reaction from the axle are transmitted to the vehicle frame through the spring without the use of a separate torque rod.

Referring to the form of invention shown in Fig. 2, it will be understood that the middle part of the axle may be the same as that shown in Fig. 1 and that certain other parts are exactly the same as those shown in Fig. 1, similar reference numerals being used to indicate them. The torque reaction member 40 has the same jaw connection 45, 46 with the spring pad 23, but the securing nut 47' threads into the interior of the axle member 10 instead of on the outside thereof. This nut in either case may be reached and operated by a spanner or socket wrench as desired.

The form of the main bearings 49' and 50' is slightly different though the function and operation are the same. The intermediate gears 56 are mounted on roller bearings 56ª instead of on plain bearings as shown in the other form. Only the hub part 33' is provided with a flange 37' and this flange and the brake drum 28 are secured to the spokes 32' of the road wheel. An additional plate member 32ª and bolts 36 and 36' are used in this wheel construction. The outer hub part 34' is secured to the hub part 33', and the gear member 35' is secured between them by a series of bolts 36".

In this form also the outer hub part 34' is formed with a large central opening 60 in which the bearing 50' is mounted. A cap 61 is detachably secured as by bolts 62 over this opening. Removal of this cap 61 gives access to the bearing 50' and to the interior of the sleeve 48' of the member 40.

Instead of supporting the outer end of the axle section 18 in a bearing in the sleeve 48', said axle section is supported by the gears 56 with which it meshes. It is axially positioned however by a button 54' which is mounted in an adjustable block 63 threaded as at 64 into the sleeve 48' of the torque reaction member. This block is partly split as at 65 and a bolt 66 is adapted to distort the block slightly to lock it in adjusted position.

It will be seen that the opening in the sleeve 48' is larger than the pinion 55 on the outer end of the axle section 18 and that therefore, after the cap 61 and the block 63 have been removed, the axle section with its pinion may be withdrawn from the axle member through the sleeve 48'. Thus it is possible to disassemble the construction by removing the outer hub part 34', withdrawing the axle section 18, unscrewing the nut 47', and withdrawing the torque reaction member 40. The parts may be assembled by the reverse operation.

In Fig. 4 both of the hub parts 33, 34 are provided with flanges 37, but the internal gear 35'' is riveted to an extension 33'' on one of the hub parts instead of being connected directly to the spoke member or clamped between the hub parts as in the other constructions. The bolt 36 is the same as the bolt shown in Fig. 1.

It will be understood that other forms may be used without departing from the spirit or scope of the invention.

Having thus described my invention, what I claim and desire to secure by Letters Patent is:—

1. In wheel and axle construction, the combination with an axle member and a spring pad mounted thereon, of a torque reaction member sleeved on the outside of said axle member and connected to said spring pad, a road wheel mounted on bearings on said torque reaction member, a driving shaft extending through the axle member and having a pinion at its outer end, a gear mounted on the road wheel, and intermediate gears mounted on the torque reaction member meshing with said pinion and wheel gear.

2. In wheel and axle construction, the combination with an axle member and a spring pad mounted thereon, of a torque reaction member sleeved on the outside of said axle member and connected to said spring pad, a road wheel mounted on a pair of separated bearings on said torque reaction member, a driving shaft extending through the axle member and having a pinion at its outer end, a gear mounted on said road wheel and arranged between the road wheel bearings, and intermediate gears supported by the torque reaction member meshing with said pinion and wheel gear.

3. In wheel and axle construction, the combination with an axle member and a spring pad mounted thereon, of a torque reaction member on the end of said axle member and connected directly to the spring pad, a gear mounted on said reaction member, a road wheel having separated bearings on said torque reaction member, one bearing being on either side of said gear, a driving shaft in the axle member and having a pinion in mesh with said gear and a gear mounted on said wheel also in mesh with said first mentioned gear.

4. In an axle, in combination, a tubular axle member, a driving shaft therein having a gear at its outer end, and an adjustable abutment supported by said axle member in contact with the end of said driving shaft.

5. In an axle, in combination, a tubular axle member, a torque reaction member on the end thereof and extending beyond the end of the axle member, said torque reaction member having an opening therein in axial alignment with the axis of said axle member, a driving shaft in said axle member and a gear on said driving shaft smaller in circumference than said opening.

6. In an axle, in combination, a tubular axle member, a torque reaction member mounted thereon and extending beyond the end thereof, said latter member having an opening in line with the axle member, a driving shaft in said axle member, and an adjustable abutment in said opening adapted to contact with the end of said driving shaft.

7. In an axle, in combination, a tubular axle member, a torque reaction member mounted thereon and extending beyond the end thereof, said latter member having an opening in line with the axle member, a driving shaft in said axle member, and an adjustable abutment in said opening adapted to contact with the end of said driving shaft, said shaft having a gear thereon and said opening being large enough to permit withdrawal of said shaft and gear through said opening.

8. In a wheel and axle construction, the combination with an axle member, of a torque reaction member thereon, a gear mounted in said torque reaction member, a driving shaft in said axle member and having a pinion in mesh with said gear, and a wheel having a pair of separated bearings on said torque reaction member on either side of said gear, said wheel comprising a two-part hub and a gear, the latter of which meshes with the gear of said torque reaction member.

9. In a wheel and axle construction the combination with an axle member, of a driving shaft therein having a pinion at its outer end, a gear supported by said axle member in mesh with said pinion and a wheel having a gear in mesh with the first gear and driven thereby and having a two-part hub with one part extending on each side of said gear and having a bearing supported by the axle member.

10. In an axle, in combination, a hollow axle member, a differential mechanism therein, a pair of axle sections in said axle, the inner ends of said axle sections being arranged withdrawably in said differential mechanism, a bearing for each of said axle sections at their outer ends, said bearings permitting slight longitudinal movement of the axle sections, an abutment at the outer end of each axle section limiting the outward movement thereof, and a spring device arranged between the inner ends of said axle sections to yieldingly press them outwardly.

11. In an axle, in combination, a hollow axle member, a differential mechanism therein, a pair of axle sections in said axle, the inner ends of said axle sections being arranged withdrawably in said differential mechanism, a bearing in each of said axle sections at their outer ends, said bearings permitting slight longitudinal movement of the axle sections, an abutment at the outer end of each axle section limiting the outward movement thereof, and a coil spring and contact pieces arranged in said differential mechanism between the ends of said axle sections for the purpose specified.

12. A road wheel comprising rim and spoke members, two hub members forming a gear case between them and having peripheral flanges, an internal gear member having a peripheral flange, and bolts extending through all of said flanges and said spoke members and securing the hub members and gear member to the spokes.

13. A road wheel comprising rim and spoke members, and an associated brake drum, a two-part hub member secured to the spoke members, and an internal gear secured to one of said hub members.

14. A road wheel comprising rim and spoke members, and a brake drum, a two-part hub member secured to the spoke members, clamping the brake drum thereagainst, an axle section and gearing connections between the axle section and the wheel including an internal gear secured to one of the hub members.

15. In an axle, in combination, a stationary axle member, wheels at the ends thereof, a differential mechanism mounted at the middle of the axle, one-piece axle sections or shafts connecting said mechanism with the wheels, and a spring between said shafts urging them apart to prevent undue end play.

16. In an axle, in combination, a stationary axle member, wheels at the ends thereof, a differential mechanism mounted at the middle of the axle, one-piece axle sections or shafts connecting said mechanism with the wheels, a contact piece on each wheel at the outer ends of said shafts, and a spring between the shafts yieldingly pressing the shafts into contact with said contact pieces.

17. In an axle, in combination, a stationary axle member, wheels at the ends thereof, a differential mechanism mounted at the middle of the axle, one-piece axle sections or shafts connecting said mechanism with the wheels, a contact piece on each wheel at the outer ends of said shafts, and a coil spring in said mechanism between the inner ends of the shafts tending to press the shafts endwise into contact with said contact pieces.

18. In an axle, in combination, a stationary axle member, wheels at the ends thereof, a differential mechanism mounted at the middle of the axle, axle sections or shafts connecting said mechanism with the wheels, and a spring mounted in the differential spider between said shafts to prevent undue end play.

In testimony whereof I affix my signature.

HAROLD D. CHURCH.